US006810438B1

(12) United States Patent
Chrysanthakopoulos

(10) Patent No.: US 6,810,438 B1
(45) Date of Patent: Oct. 26, 2004

(54) METHOD FOR ENABLING VALUE-ADDED FEATURE ON HARDWARE DEVICES USING A CONFIDENTIAL MECHANISM TO ACCESS HARDWARE REGISTERS IN A BATCH MANNER

(75) Inventor: Georgios Chrysanthakopoulos, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/543,701

(22) Filed: Apr. 5, 2000

(51) Int. Cl.[7] ............................ G06F 3/00; G06F 13/00; G06F 9/44

(52) U.S. Cl. ...................... 710/16; 710/302; 717/107; 719/321

(58) Field of Search ......................... 710/30; 709/108; 703/25; 375/220; 235/382; 711/115; 705/1

(56) References Cited

U.S. PATENT DOCUMENTS

| | | | | |
|---|---|---|---|---|
| 5,307,491 A | * | 4/1994 | Feriozi et al. ................. | 703/25 |
| 5,590,193 A | * | 12/1996 | Le Roux ..................... | 235/382 |
| 5,875,313 A | * | 2/1999 | Sescila, III et al. ........... | 710/30 |
| 5,901,303 A | * | 5/1999 | Chew .......................... | 711/115 |
| 5,903,775 A | * | 5/1999 | Murray ........................ | 375/220 |
| 6,012,033 A | * | 1/2000 | Vanden Berge ................ | 705/1 |
| 6,289,396 B1 | * | 9/2001 | Keller et al. ................. | 709/108 |

* cited by examiner

Primary Examiner—Glenn A. Auve
Assistant Examiner—Christopher E. Lee
(74) Attorney, Agent, or Firm—Banner & Witcoff, Ltd.

(57) ABSTRACT

A method for enabling value-added hardware on an interface board in a computer system is disclosed. The method first determines whether an interface board is connected to a bus of a computer system. Then, a general-purpose top-level device driver, which controls standard functions associated with the interface board, is loaded into kernel memory space of the computer system. Next, a value-added device driver is loaded into memory of the computer system. The value-added device driver corresponds to the interface board determined to be connected to the bus of the computer system. Predetermined information, such as a password, or confidential or cryptographic information, is stored at a predetermined address within a memory space of the interface board. The predetermined address corresponds to a predetermined address within value-added hardware on the interface board. A predetermined response is received from the interface board based on the predetermined information. Access to the value-added hardware is enabled through the value-added device driver when the predetermined response is an expected response. The value-added device driver can be loaded into kernel memory of the computer, or can be part of an application program that is loaded into user memory of the computer.

18 Claims, 3 Drawing Sheets

METHOD FOR ENABLING VALUE-ADDED FEATURE ON HARDWARE DEVICES USING A CONFIDENTIAL MECHANISM TO ACCESS HARDWARE REGISTERS IN A BATCH MANNER

TECHNICAL FIELD

The present invention relates to the field of interface boards for a computer system. More particularly, the present invention relates to a method for enabling value-added hardware on a peripheral controller interface (PCI) board in a computer system.

BACKGROUND OF THE INVENTION

Presently, a standard peripheral controller interface (PCI) board, such as an OHCI 1394 controller board, is used in a computer system for interfacing the computer system to a peripheral device, such as a disk drive or video equipment. Published standards define the various standard functions and features provided by such a PCI board. Accordingly, all interfacing between a computer system and a standard serial bus controller PCI board is performed through a standard general-purpose device driver that is usually provided as part of the operating system of the computer.

The standard-function nature of a standard controller board makes it unattractive for many vendors to add value-added features and hardware, such as a proprietary digital signal processing (DSP) function, to a PCI board. Any additional functions and/or features that a vendor may add to a standard PCI board must be accessed through the standard general-purpose top-level device driver provided by the operating system of the computer. Consequently, other interface board vendors can easily duplicate the value-added features, and produce equivalent value-added PCI boards for less cost than a vendor who introduces innovative functions and features to the marketplace.

What is needed is a way for an interface board vendor to produce a controller board providing standard interface functions, in addition to value-added functions, thereby differentiating the vendor's interface controller board from other vendors' interface controller boards. Additionally, what is needed is a way to enable value-added hardware on an interface controller board that provides standard interface functions.

SUMMARY OF THE INVENTION

The present invention provides a way for an interface board vendor to produce an interface controller board providing standard interface functions and value-added functions, such as proprietary DSP functions, thereby differentiating the vendor's interface controller board from other vendors' interface controller boards. Additionally, the present invention provides a way to enable value-added hardware on an interface board that provides standard interface functions. Another advantage provided by the present invention is that access to the value-added hardware can be controlled through a special handshaking procedure, thereby allowing operation of the value-added hardware only when the interface controller board is in a predetermined state. Another advantage of the present invention is that a controller board vendor is not required to provide a value-added device component driver that is coordinated with the general-purpose device driver for the controller board. Further, a new value-added device driver is not required when the standard functions associated with the interface controller board are updated based on a new version of the standard governing interface board.

The advantages of the present invention are provided by a method for enabling value-added hardware on an interface board in a computer system. According to the present invention, it is first determined whether an interface board is connected to a bus of a computer system. Then, a general-purpose top-level device driver, which controls standard functions associated with the interface board, is loaded into kernel memory space of the computer system when the interface board is determined to be connected to the bus of the computer system. The general-purpose top-level device driver controls standard functions associated with the interface board. A value-added device driver is loaded into memory of the computer system when the interface board is determined to be connected to the bus of the computer system. The value-added device driver corresponds to the interface board determined to be connected to the bus of the computer system. Actually, the vendor-supplied driver is loaded always for particular model of the PCI card. The value-added device driver can be loaded into memory as a filter driver so that it does not conflict with the general-purpose top-level device driver. Alternatively, a value-added device driver can be loaded into memory when a device is plugged in to an external port on the interface board. Predetermined information, such as a password, or confidential or cryptographic information, is then stored at a predetermined address within a memory space of the value-added hardware, and a predetermined response is received from the value-added hardware based on the predetermined information. Access to the value-added hardware is enabled through the value-added device driver when the predetermined response is an expected response. According to the invention, the value-added device driver can be loaded into kernel memory of the computer, or can be part of an application program that is loaded into user memory of the computer.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Although not required, the invention will be described in the general context of computer-executable instructions, such as program modules, that are executed by a personal computer or a server. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
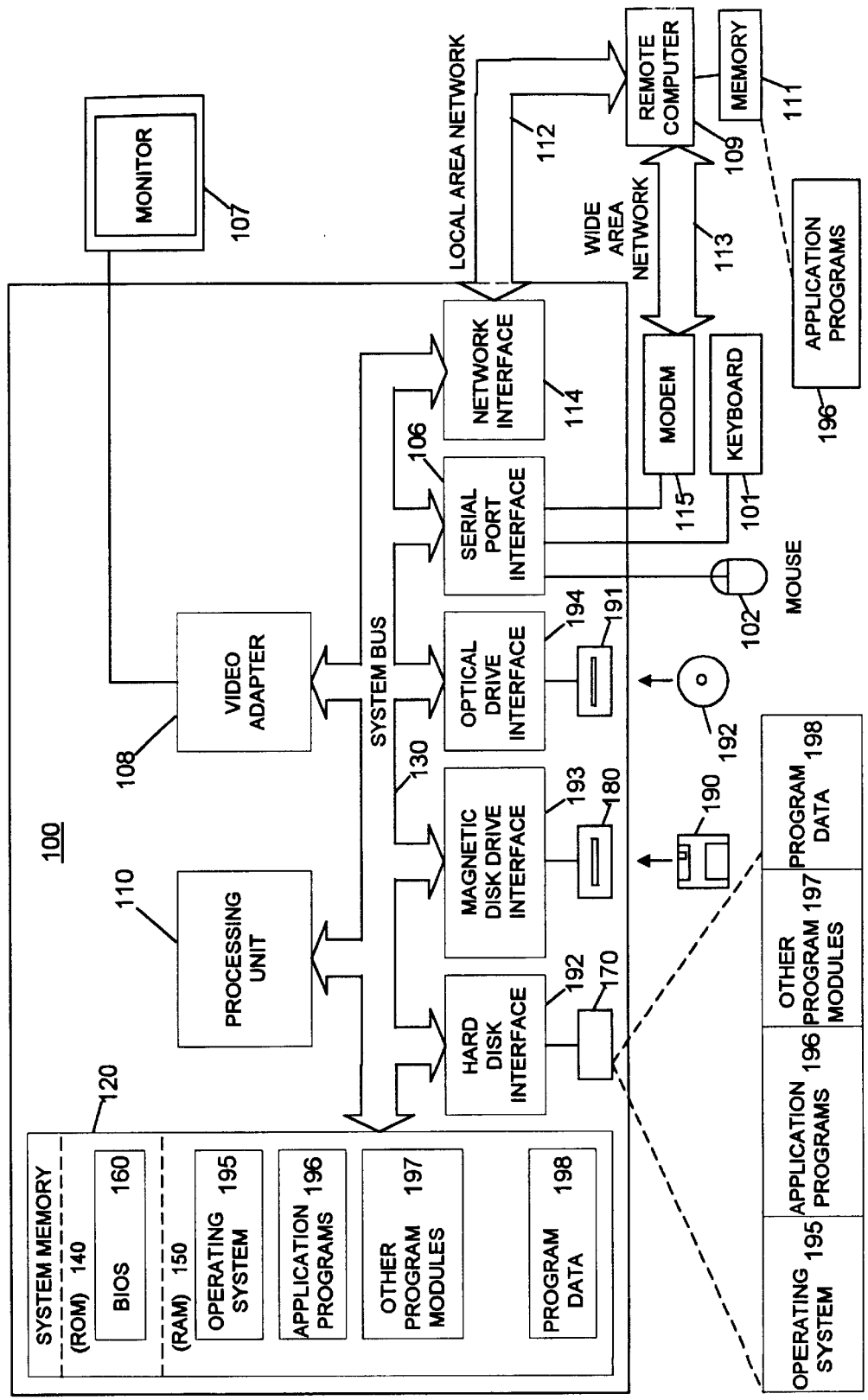
FIG. 1 is a schematic diagram of a conventional general-purpose digital computing environment that can be used to implement various aspects of the invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port, a universal serial bus (USB) or through a PCI board. A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other ways of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

A primary aspect of the invention provides a technique for enabling value-added hardware on an interface controller board, such as a PCI board, that provides standard interface functions. In that regard, the present invention provides a controlled, secure access to value-added hardware on an interface controller board, such as an OHCI 1394 controller board. The value-added hardware co-exists with standard hardware for the controller board, and is accessible through a secondary register address space. For an OHCI 1394-compliant PCI board, the secondary register address space is specifically the vendor address space. In contrast, the standard hardware and standard functions of an interface controller board are accessible through a primary register address space. The present invention will be described with reference to FIGS. 2–3.

Figure 2:
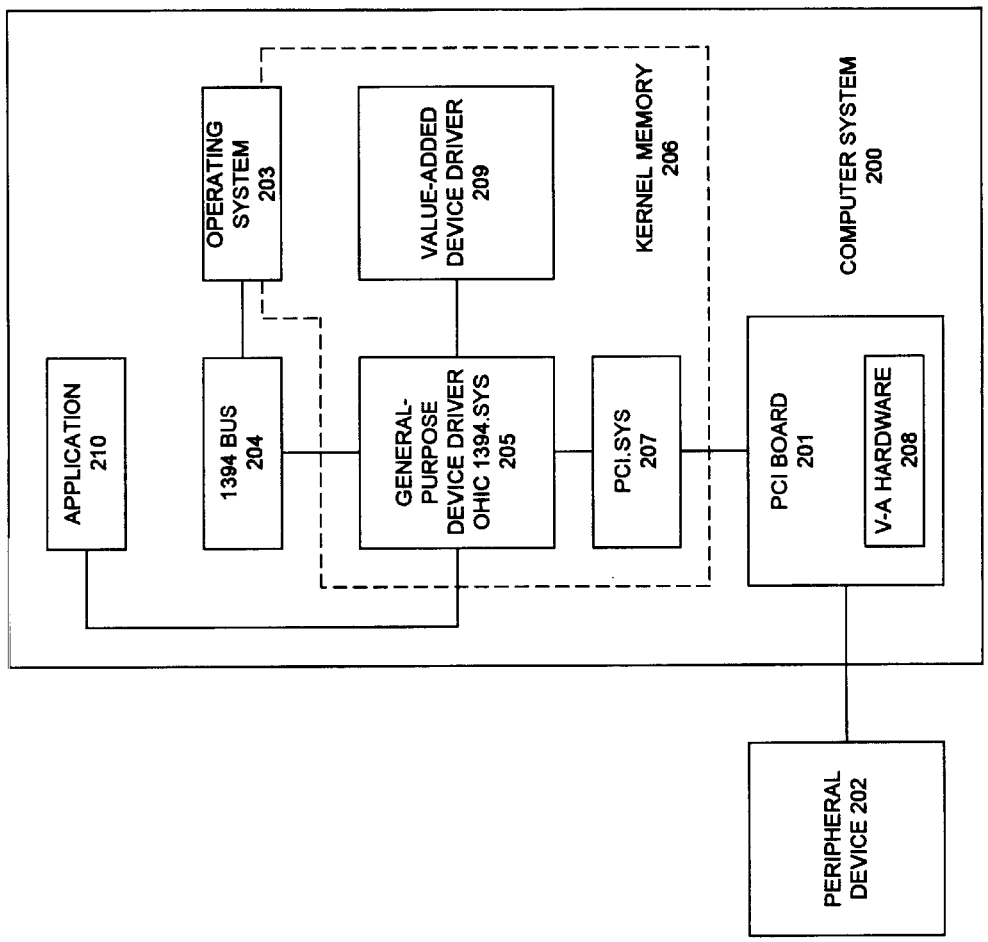
FIG. 2 shows a functional block diagram of a computer system incorporating the present invention for enabling value-added hardware on an interface controller board.
Figure 3:
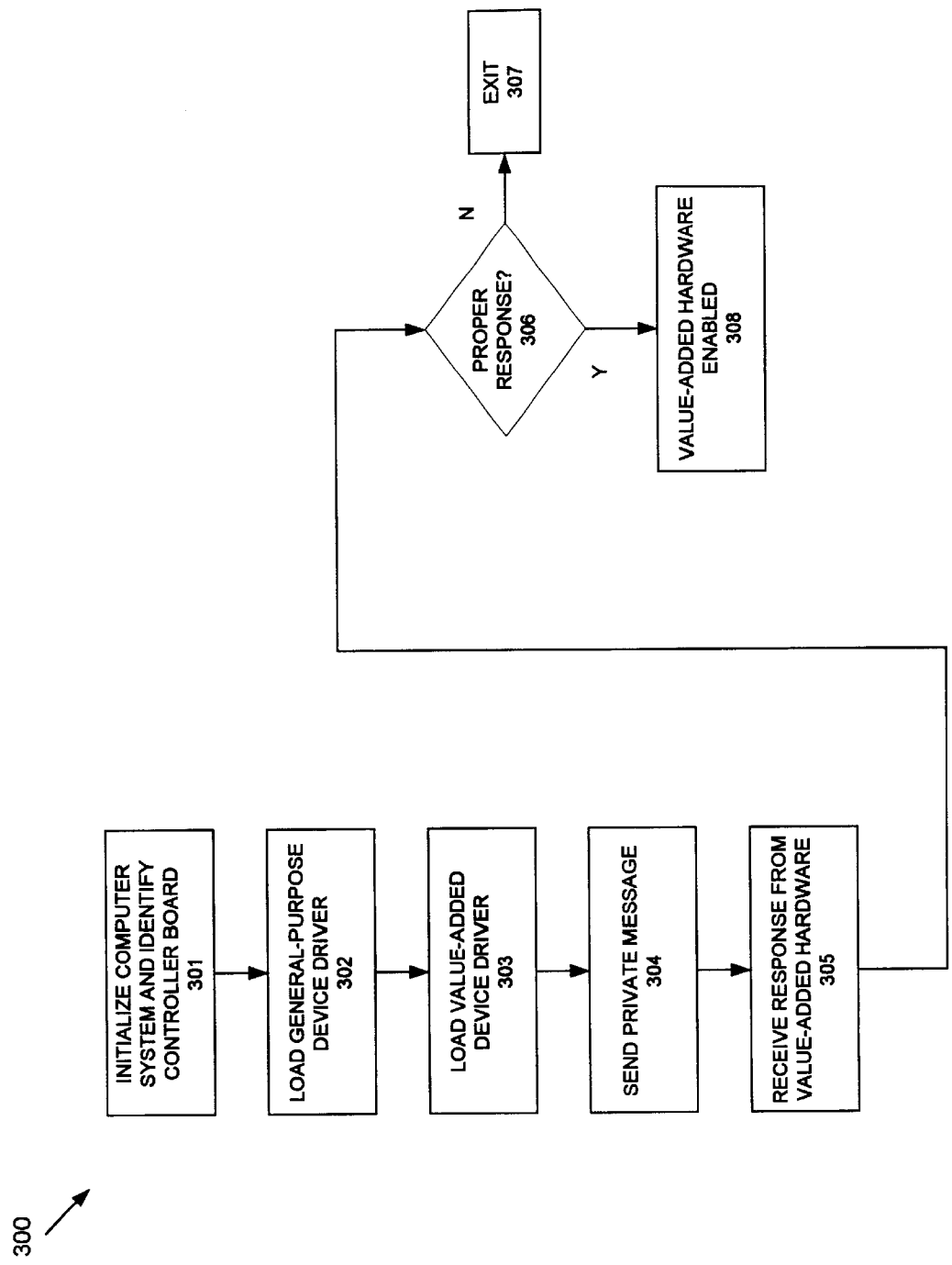
FIG. 3 shows a flow diagram for enabling value-added hardware on an interface controller board in a computer system.

FIG. 2 shows a functional block diagram of a computer system 200 incorporating the present invention. Computer system 200 includes a PCI board 201 interfacing to a peripheral device 202, such as a digital camera. Computer system 200 also includes an operating system (OS) 203, such as "WINDOWS" brand operating system. FIG. 3 shows a flow diagram 300 for enabling value-added hardware on an interface controller board in a computer system, such as computer system 200 shown in FIG. 2.

When computer system 200 is initialized at step 301, specific hardware configuring computer 200 is identified by operating system 203 in a well-known manner, such as through the well-known "PLUG AND PLAY" mechanism. For example, computer system 200 includes a 1394 bus 204. Operating system 203 identifies bus 204 and at step 302, a standard general-purpose device driver 205, such as the OHCI 1394.sys device driver, is loaded into a kernel memory space 206 of computer system 200. General-purpose device driver 205 is a top-level device driver that provides functionality for accessing the standard interface functions of PCI board 201. As part of the initialization process, general-purpose driver 205 identifies another general-purpose lower-level device driver 207, such as the PCI.sys device driver, based on the unique identity of PCI board 201. Lower-level device driver 207 is also loaded into kernel memory 206.

At step 303, a value-added device driver 209 corresponding to the identified interface board is loaded into memory. Value-added device driver 209 provides an interface for access to the value-added hardware 208, thereby making the value-added functions associated with value-added hardware 208 available.

At step 304, value-added device driver 209 sends a predetermined private message to a predetermined address within the value-added hardware space using a Globally Unique Identifier/Universally Unique Identifier (GUID) in a well-known manner. The predetermined private message can be a password, or confidential or cryptographic information. The predetermined private message is written in a batch mode to hardware registers within the value-added hardware 208 that have been mapped into memory space of computer system 200. More specifically, the value-added hardware is accessible through a secondary register address space of controller board 201. For an OHCI 1394-compliant PCI controller, the secondary register address space is specifically the vendor address space. In contrast, the standard hardware and standard functions of a PCI controller board are accessible through a primary register address space.

If the value-added hardware 208 recognizes the confidential message, value-added hardware 208 responds with a predetermined private message, which is received by value-added device driver 209 at step 305. The response generated by value-added hardware 208 can also be, for example, a password, or confidential or cryptographic information. If, at step 306, value-added device driver 209 recognizes the private response, the features of value-added hardware 208 on PCI board 201 are enabled at step 308. Subsequently, access to the value-added functions of PCI board 201 is provided through value-added device driver 209. General-purpose device driver 205 examines commands generated by value-added device driver 209 for detecting faults or errors in the commands. If at step 306, value-added device driver 209 does not recognize the response or no response is received, flow continues to step 307 where the process is exited.

The present invention is not limited to an OHCI 1394 compliant PCI controller board, but can be used for enabling value-added hardware on another standard protocol interface board, such as an interface board based on the SCSI protocol. Further, applications can directly access the value-added hardware of an interface board. The application program determines whether an interface board is connected to a bus of the computer system. An application 210, shown in FIG. 2, can also enable and access the value-added hardware provided on PCI board 201 by directly using a device information (INF) file in a well-known manner. The application then sends a predetermined private message to a predetermined address within the value-added hardware space. Data can then be passed back and forth between application 210 and value-added hardware 209 using, for example, the well-known "WINDOWS MANAGEMENT INSTRUMENTATION" (WMI) technique. In addition or alternatively, an application can access a value-added device driver to take advantage of features provided by the value-added device driver for manipulating a kernel mode API of the general-purpose device driver.

While the present invention has been described in connection with the illustrated embodiments, it will be appreciated and understood that modifications may be made without departing from the true spirit and scope of the invention.

What is claimed is:

1. A method for enabling access to value-added functions of value-added hardware on an interface board in a computer system, the method comprising steps of:

determining whether an interface board is connected to a bus of a computer system;

loading a general-purpose top-level device driver into kernel memory space of the computer system when the interface board is determined to be connected to the bus of the computer system, the general-purpose top-level device driver controlling standard functions associated with the interface board;

loading a value-added device driver into memory of the computer system when the interface board is determined to be connected to the bus of the computer system, the value-added device driver corresponding to the interface board determined to be connected to the bus of the computer system;

storing predetermined information at a predetermined address within a memory space of the interface board, the predetermined address corresponding to a predetermined address within value-added hardware on the interface board;

receiving a predetermined response from the interface board based on the predetermined information; and enabling access to the value-added functions of the value-added hardware through the value-added device driver only if the predetermined response is an expected response.

2. The method according to claim 1, wherein the value-added device driver is loaded into kernel memory of the computer system.

3. The method according to claim 1, wherein the value-added device driver is part of an application program that is loaded into user memory of the computer system.

4. The method according to claim 1, wherein the predetermined information is secret information, and wherein the predetermined address within the memory space of the value-added hardware is a secret address.

5. The method according to claim 1, wherein the interface board is an OHCI 1394 interface board.

6. The method according to claim 1, wherein the value-added device driver is a filter driver that does not conflict with the general-purpose top-level device driver.

7. A computer-readable medium having computer-executable instructions for performing steps comprising:

determining whether an interface board is connected to a bus of a computer system;

loading a general-purpose top-level device driver into kernel memory space of the computer system when the interface board is determined to be connected to the bus of the computer system, the general purpose top-level device driver controlling standard functions associated with the interface board;

loading a value-added device driver into memory of the computer system when the interface board is determined to be connected to the bus of the computer system, the value-added device driver corresponding to the interface board identified to be connected to the bus of the computer system;

storing predetermined information at a predetermined address within a memory space of the interface board, the predetermined address corresponding to a predetermined address within value-added hardware on the interface board;

receiving a predetermined response from the interface board based on the predetermined information; and enabling access to value-added functions of the value-added hardware through the value-added device driver, only if the predetermined response is an expected response.

8. The computer-readable medium according to claim 7, wherein the value-added device driver is loaded into kernel memory of the computer system.

9. The computer-readable medium according to claim 7, wherein the value added device driver is part of an application program that is loaded into user memory of the computer system.

10. The computer-readable medium according to claim 7, wherein the predetermined information is secret information, and wherein the predetermined address within the memory space of the value-added hardware is a secret address.

11. The computer-readable medium according to claim 7, wherein the interface board is an OHCI 1394 interface board.

12. The computer-readable medium according to claim 7, wherein the value-added device driver is a filter driver that does not conflict with the general-purpose top-level device driver.

13. A method for enabling access to value-added functions of value-added hardware on an interface board in a computer system, the method comprising steps of:

loading an application program in a memory space of a computer system;

determining whether an interface board is connected to a bus of the computer system using the application program;

loading a value-added device driver into memory of the computer system when the interface board is determined to be connected to the bus of the computer system, the value-added device driver corresponding to the interface board determined to be connected to the bus of the computer system;

storing predetermined information at a predetermined address within a memory space of the interface board, the predetermined address corresponding to a predetermined address within value-added hardware on the interface board;

receiving a predetermined response from the interface board based on the predetermined information; and enabling access to the value-added functions of the value-added hardware through the value-added device driver only if the predetermined response is an expected response.

14. The method according to claim 13, wherein the predetermined information is secret information, and wherein the predetermined address within the memory space of the value-added hardware is a secret address.

15. The method according to claim 13, wherein the interface board is an OHCI 1394 interface board.

16. A computer-readable medium having computer-executable instructions for performing steps comprising:

loading an application program in a memory space of a computer system;

determining whether an interface board is connected to a bus of the computer system using the application program;

loading a value-added device driver into memory of the computer system when the interface board is determined to be connected to the bus of the computer system, the value-added device driver corresponding to the interface board determined to be connected to the bus of the computer system;

storing predetermined information at a predetermined address within a memory space of the interface board, the predetermined address corresponding to a predetermined address within value-added hardware on the interface board;

receiving a predetermined response from the interface board based on the predetermined information; and enabling access to value-added functions of the value-added hardware through the value-added device driver only if the predetermined response is an expected response.

17. The method according to claim 16, wherein the predetermined information is secret information, and wherein the predetermined address within the memory space of the value-added hardware is a secret address.

18. The method according to claim 16, wherein the interface board is an OHCI 1394 interface board.

* * * * *